(No Model.)

C. H. ENSIGN.
METALLIC PISTON ROD PACKING AND GLAND.

No. 520,954. Patented June 5, 1894.

Witnesses,

Inventor,
Charles H. Ensign
By Dewey & Co.
Att'ys

UNITED STATES PATENT OFFICE.

CHARLES H. ENSIGN, OF KEKAHA, HAWAII.

METALLIC PISTON-ROD PACKING AND GLAND.

SPECIFICATION forming part of Letters Patent No. 520,954, dated June 5, 1894.

Application filed September 5, 1893. Serial No. 484,859. (No model.)

*To all whom it may concern:*

Be it known that I, CHARLES H. ENSIGN, a citizen of the United States, residing at Kekaha, Kauai, Hawaiian Islands, have invented an Improvement in Metallic Piston-Rod Packings and Glands; and I hereby declare the following to be a full, clear, and exact description of the same.

My invention relates to an improved metallic packing and gland for piston rods.

It consists in certain details of construction which will be more fully explained by reference to the accompanying drawings, in which—

Figure 1:
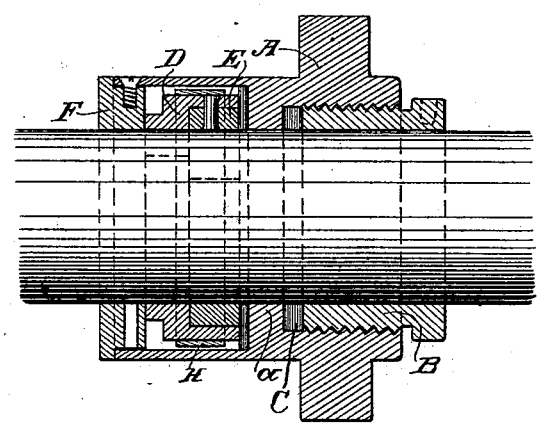
Figure 2:
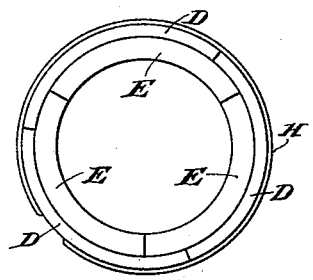
Figure 3:
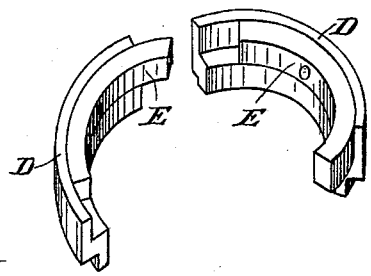

Figure 1 is a longitudinal section taken through the gland and packing. Fig. 2 is an end view of my rings. Fig. 3 shows ring sections detached from one another.

The object of my invention is to provide a metallic packing for reciprocating piston and other rods, in which the packing rings are fitted into and inclosed within the removable gland of the stuffing-box, with means for inspection and adjustment, as will be more fully described in the following specification.

A is a gland such as is ordinarily fitted to form a follower in stuffing-boxes as usually constructed.

In my construction, the gland is chambered out from both inner and outer end, leaving an annular flange $a$ projecting inwardly about midway, and it is adapted to receive a gland nut B which surrounds the piston rod, and is screwed into the chamber by means of a pin which is inserted into holes made around the periphery of the nut, or if preferred the nut may be made polygonal to receive a wrench. The chamber C within the gland nut B is adapted to receive soft packing which is held between the gland nut and the flange $a$, and serves to prevent the escape of any small quantity of steam which may leak between the metallic packing rings and the piston rod before they become perfectly fitted. The inner chamber which is made in the gland A, is adapted to receive the packing rings D and E. The inner surface of the flange $a$ is ground so as to make a perfect steam joint against which the inner ends of the rings D E fit. These rings are made in segments, as shown plainly in Fig. 2, the smaller segments E being rabbeted into the inside edge of the larger segments D which are chambered out for this purpose, and the peripheries of the segments D which surround the inner segments E have the ends just flush with the ends of the segments E so that the two rest upon the ground surface of the flange $a$. The segments are also placed together so that the joints of the inner and outer segments do not come opposite each other, and this prevents steam passing through the joints of the segments. The inner rings are secured within the outer ones. The chamber made at the inner end of the gland is somewhat deeper than the length of the rings, and is adapted to admit a cap F which fits into the chamber, where it is secured by two flat-headed screws. In practice, I have shown the inner end of the ring D as turned down to a smaller diameter, and this part projecting beyond the body of the ring and the flange cap F presses against this part, and holds the rings closely against the seat of $a$, thus dispensing with a spring which might otherwise be needed at this point. The chamber around the rings E and D is of larger diameter than the rings, and steam is allowed to enter this chamber around the piston rod which passes loosely through the cap plate F, and the steam thus acts to press the rings against the piston rod, and also acting against the end which is exposed, to keep the rings against their seat.

In order to retain the rings in place, when not under steam pressure, I have shown a surrounding inclosing spring H which is made of light material, and just clasps the rings sufficiently to retain them in contact with the piston rod. Steam passing between the joints of the rings counterbalances the pressure of the spring on the outside to such an extent that the friction is reduced to a minimum.

This packing is extremely simple; being all fitted into the gland, it is removable with the gland for inspection or repair.

As the rings are loose within their chamber they may move around upon the seat and follow any irregularity of the piston rod if it happens to run out of line while still maintaining a steam tight joint.

When the cap F is in place the gland has the same appearance as any other gland, and if necessary a tight joint may be made with soft packing in the stuffing-box in the usual manner.

Having thus described my invention, what I claim as new, and desire to secure by Letters Patent, is—

1. In a packing for reciprocating rods, the combination, with a gland having inner and outer chambers with intermediate annular flange, and a gland nut fitting within the outer chamber, of the packing rings the diameter of which is less than the diameter of the inner chamber in which they are seated whereby a surrounding steam space is formed, one of said rings having its end projecting, an elastic ring surrounding the packing rings and holding them in place, and a cap closing the outer end of the inner chamber and bearing against the extension of the ring whereby the opposite ends of the rings are held against the annular flange to form a steam tight joint, substantially as herein described.

2. A metallic reciprocating rod packing consisting of a gland having an outer chamber for soft packing and a retaining gland nut fitted therein, an inner chamber with segmental concentric rings of smaller diameter than the chamber, and a surrounding spring by which they are retained in contact with the rod, an annular flange formed in the gland intermediate between the outer and inner chambers having its inner surface faced to form a steam tight joint with the ends of the packing rings, a cap ring fitting the end of the packing, ring chambers extending therein to press against the inner periphery of the packing rings, and an annular space surrounding the rings and the end thereof for the admission of steam to seat and counterbalance the rings, substantially as herein described.

In witness whereof I have hereunto set my hand.

CHARLES H. ENSIGN.

Witnesses:
T. FASSOTT,
AD. LINDSAY,
TH. BRANDT.